United States Patent [19]

Salisbury

[11] 4,266,851
[45] May 12, 1981

[54] COUPLER FOR A CONCENTRIC CORE OPTICAL FIBER

[75] Inventor: Glenn C. Salisbury, Roanoke, Va.

[73] Assignee: International Telephone and Telegraph Corporation, New York, N.Y.

[21] Appl. No.: 91,914

[22] Filed: Nov. 6, 1979

[51] Int. Cl.³ ............................................. G02B 5/14
[52] U.S. Cl. ................................ 350/96.15; 250/227; 350/96.33
[58] Field of Search ............... 350/96.15, 96.16, 96.20, 350/96.21, 96.30, 96.33; 250/227; 65/4 B; 156/158

[56] References Cited

U.S. PATENT DOCUMENTS

| | | | |
|---|---|---|---|
| 4,000,416 | 12/1976 | Goell | 350/96.33 X |
| 4,054,366 | 10/1977 | Barnoski et al. | 350/96.15 |
| 4,076,375 | 2/1978 | Muska et al. | 350/96.15 |
| 4,135,780 | 1/1979 | Dyott | 350/96.15 |
| 4,149,772 | 4/1979 | Iyengar et al. | 350/96.33 |
| 4,169,656 | 10/1979 | Hodge | 350/96.15 |
| 4,201,447 | 5/1980 | Thompson et al. | 350/96.15 X |

FOREIGN PATENT DOCUMENTS 52-27644   3/1977   Japan .................... 350/96.30

OTHER PUBLICATIONS

"Research Toward Optical-Fiber Transmission Systems, Part II", Miller et al., *Proc. of IEEE*, vol. 61, No. 12, Dec. 1973, pp. 1726-1751.

*Primary Examiner*—John K. Corbin
*Assistant Examiner*—John D. Lee
*Attorney, Agent, or Firm*—John T. O'Halloran; Peter C. Van Der Sluys

[57] ABSTRACT

A coupler for a concentric core optical fiber comprises a step index fiber having an inner core diameter equal to the diameter of the inner core of the concentric fiber. The inner cores of both fibers are aligned and face each other. When positioned in this manner, the cladding layer of the step index fiber is also aligned with the isolation zone of the concentric core fiber and the outer core of the concentric core fiber is aligned with the substrate of the step index fiber. A large glass rod or cane is then fused to the outer periphery of the step index fiber to cause light propagating in the substrate to couple to the cane. The light thus propagating is indicative of the light that is transmitted by the concentric fiber in the outer core. The signal propagating in the inner core of the step index fiber represents the signal propagating in the inner core of the concentric core fiber and can be detected by an ordinary detector. Another detector is coupled to the cane member and provides a signal proportional to the signal propagating in the outer core of the concentric fiber.

10 Claims, 3 Drawing Figures

COUPLER FOR A CONCENTRIC CORE OPTICAL FIBER

BACKGROUND OF THE INVENTION

This invention relates to couplers for optical fibers and more particularly to a coupler device for a concentric core fiber.

Essentially, a concentric core fiber has been developed and such fibers are available and have been manufactured by ITT Electro-Optical Products Division, Roanoke, Virginia. A concentric fiber consists of an inner core fabricated from a relatively low loss glass such as ultra-pure fused silica or a glass doped with germanium. The inner core is surrounded by an isolation layer or an isolation zone which is an annular region normally fabricated from a borosilicate glass. The purpose of the isolation zone is to prevent light which is propagated in the inner core from being coupled to an outer core which is an annular ring of glass surrounding the isolation zone. The outer core is surrounded by a substrate layer. The concentric core fiber enables one to provide dual transmission on a single conductor and hence, one can transmit different information on the inner core as compared to the outer core.

Due to the fact that the outer core is an annular structure, there has been considerable difficulty in the prior art in attempting to couple signals which are propagating in the outer core to suitable detecting devices so that the information transmitted in the outer core is available. Certain prior art systems employ complicated devices such as specially constructed mirrors, reflectors and masks as well as various other mechanical systems to retrieve the information propagating in an outer core of a concentric fiber.

It is therefore an object of the present invention to provide a simple and efficient coupler for a concentric core fiber.

BRIEF DESCRIPTION OF THE PREFERRED EMBODIMENT

A coupling apparatus for optical fibers, comprising a longitudinal concentric core fiber, having a cross section consisting of a series of annular layers, with an inner central layer manifesting an inner light conducting core of a given diameter, surrounded by an annular isolation zone of a given width, with said zone surrounded by an outer light conducting annular core concentric with both said inner core and said zone, said fiber having an end face of said cross section, a step index fiber having an end face containing an annular cross section juxtaposed with said end face of said concentric core fiber, with an inner light conducting central core of relatively the same diameter as said inner core of said concentric fiber, with said central core surrounded by an annular cladding layer relatively congruent with said isolation zone, said cladding layer surrounded by an annular light conducting substrate layer aligned with said facing said outer annular core, whereby light propagating in said inner core of said concentric core fiber is coupled to said central core of said step index fiber and light propagating in said outer core of said concentric core fiber is propagated in said substrate layer and means coupled to said substrate layer of said step index fiber responsive to light propagating therein and therefore responsive to light propagating in said outer light conducting annular core.

BRIEF DESCRIPTION OF THE DRAWINGS

Above-mentioned and other features and objects of this invention will become more apparent by reference to the following description taken in conjunction with the accompanying drawing, in which.

DETAILED DESCRIPTION OF THE INVENTION

Figure 1:
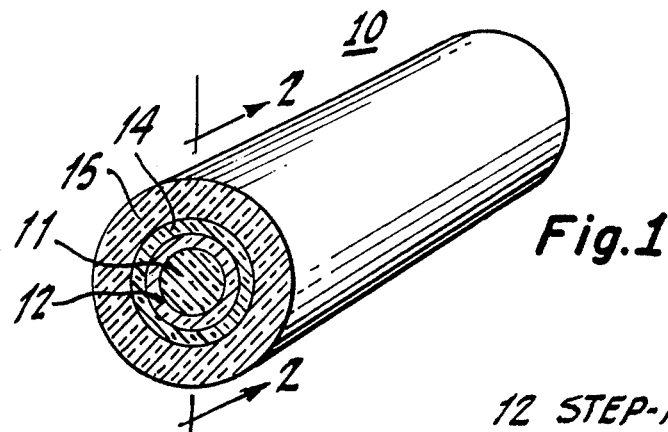
FIG. 1 is a front perspective view of a concentric core fiber.

Referring to FIG. 1, there is shown a front perspective view of a concentric core fiber 10. Essentially, the concentric core fiber consists of an inner core 11 which is of a circular configuration and of a suitable diameter. A typical diameter for the inner core of fiber 10 is about 35 microns.

The inner core is surrounded by a cladding layer 12 which serves as an isolation zone and is fabricated from a borosilicate glass. The function of the layer 12 is to provide optical isolation between the inner core 11 and the concentric core 14.

As indicated, the annular ring or zone 12 is fabricated from borosilicate glass which serves as a dark film to prevent any light from coupling from the inner core 11 to the outer concentric core.

As one can see from FIG. 1, the concentric core 14 is an annular member which may be fabricated from the same type of glass as the inner core 12 and which annular member can propagate light information. The outer core 14 is surrounded by a substrate layer 15. Substrate layers as 15 also consist of a suitable glass, the functions and compositions of which are known in the art.

As can be seen from FIG. 1, the term concentric core has been derived from the fact that an inner optical core 11 is concentrically surrounded by an outer core 14 separated by an annular isolation layer of borosilicate glass. The concentric core thus depicted enables one to transmit dual information on the inner core 11 and on the outer core 14. In this manner, one can achieve a substantial increase in the amount of information transmitted using a cable of relatively the same diameter as an ordinary optical cable.

Figure 2:
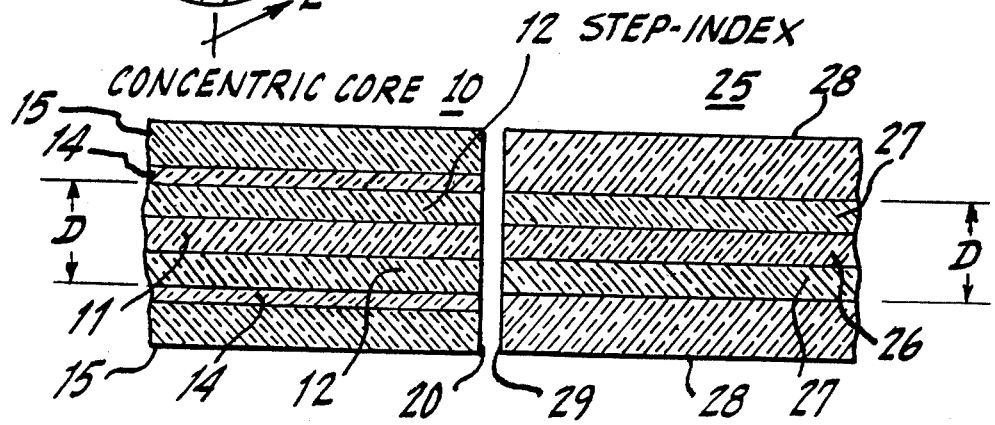
FIG. 2 is a side cross sectional view of a juxtaposed concentric core fiber aligned with a step index fiber.

Referring to FIG. 2, there is shown on the left, a cross section of the concentric core taken through line 2—2 of FIG. 1. Similar reference numerals have been employed to denote the various parts of the fiber such as the inner core 11, the isolation zone 12, the outer core 14 and the substrate 15.

Shown juxtaposed to a front surface 20 of the concentric core 10 is a cross sectional view of a step index fiber 25. Essentially, a step index fiber has an abrupt refractive index change at the boundary between the inner core 26 which has a high refractive index and the cladding portion 27 which has a lower refractive index. The cladding portion 27 is concentric to the inner core 26 and is surrounded by an outer substrate layer 28. There are many examples of step index fibers which are available in the prior art such as 25 and suitable step index fibers are manufactured by the Assignee herein.

The step index fiber 25, as will be explained, is spliced or connected to the front surface 20 of the concentric core fiber 10. The following considerations are adhered to in making this connection:

The inner core 26 of the step index fiber 25 is selected to be of the same diameter as the inner core 11 of the concentric core fiber 10. The cladding layer 27 of the step index fiber 25 is also fabricated from a borosilicate glass and is selected to be of the same dimensions as the isolation zone 12 of the concentric core. For example, the step index fiber 25 has an inner core of a diameter of 35 microns which is equal to the diameter of the inner core 11 of the concentric core 10. The width of the cladding layer 27 and the width of the isolation zone 12 are both equal and are approximately 30 microns wide. Thus, the dimensions shown on FIG. 2 as D is approximately 90 microns.

As one can ascertain from FIG. 2, the outer core 14 of the concentric core 10 is aligned with the substrate layer 28 of the step index fiber 25. In this manner, the light from the outer core 14 is caused to propagate into the cladding layer or substrate layer 28 of the step index fiber.

Figure 3:
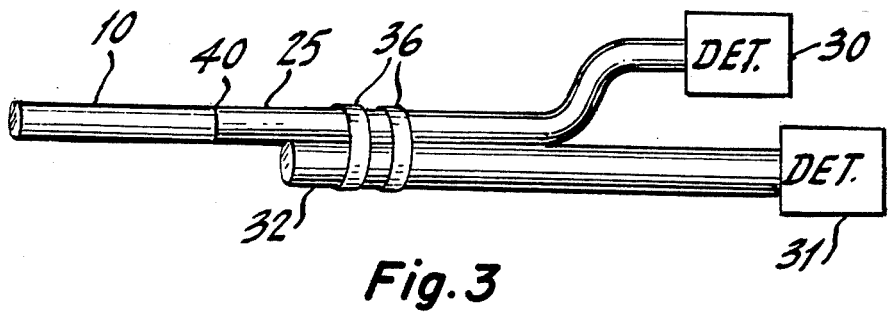
FIG. 3 is a schematic diagram of a coupler according to this invention.

Referring to FIG. 3, there is shown the concentric core 10 connected or spliced to the step index fiber 25. Coupled to the inner core of the step index fiber 25 is a first detector 30. Detector 30 is a conventional detector used in the fiber optic art and can be of many well known types. A wide variety of solid state detectors have been employed in optical communication systems and as such, include phototransistors, photoFETs, solar cells, pn photodiodes, pin photodiodes and avalanche photodiodes. As is known in the art, there are many suitable detecting devices which can function as detector 30. For examples of such devices and other configurations, reference is made to an article entitled "Optical Fiber Transmission Systems, Part II: Devices and System Considerations", Proceedings of the IEEE, December 1973, pages 1726 to 1751 by S. E. Miller, T. Li and E. A. J. Marcatilli.

To enable coupling to the light propagating in the substrate layer 28 of the step index fiber 25, a large cane 32 is fused to the surface of the substrate. Cane 32 is selected to have a diameter at least ten times greater than the diameter of the step index fiber. The overall diameter of the step index fiber 25 is about 180 microns. Hence, the diameter of the cane 32 would be about 1800 microns or larger.

The cane 32 is essentially a cylindrical glass member and may be fabricated from ordinary glass or a fused silica glass. The cane 32 may either be held in close contact with the substrate layer 28 of the step index 25 by means of bands or clamp 36 or may be directly glued or secured thereto by means of a transparent epoxy or may be fused directly thereon by forming a glass bond between the cane 32 and the periphery of the cane 32. In this manner, light propagating in the substrate layer 28 of the step index fiber 25 is coupled to the glass rod or cane 32. The cane 32 has its main axis relatively parallel to the axis of the core 26 of the step index fiber and is directed longitudinal to the length of the fiber 25 for a relatively small distance of approximately a centimeter.

The detector 31 is coupled to the cane and is responsive to the optical energy propagating in the substrate layer 28 of the fiber 25 and therefore responsive to the optical energy propagating in the outer core 14 of the concentric core fiber 10.

FIG. 3 shows the concentric core fiber 10 coupled to the step index fiber 25 at the junction 40. As above indicated, the coupling of such fibers can be accomplished by a splicing arrangement. In this manner, the concentric core fiber is cut or broken at a suitable location to form a front surface 20. The front surface 20 of the concentric core fiber 10 is aligned under a microscope with the front surface 29 (FIG. 2) of the step index fiber 25. The two fibers are then placed in contact and heated by means of a torch or other source so that the glass components of each fiber fuses together at the junction.

It is also understood that a mechanical connection can be made. In this manner, the front surface 20 of fiber 10 would be polished as would the front surface 29 of fiber 25. The surfaces would be held in alignment and secured together by means of a glue or epoxy or by means of an outer band holding the fibers at surfaces 20 and 29 in intimate contact. There are many ways of coupling such fibers together.

Again referring to FIG. 3, if one replaced detectors 30 and 31 with optical sources such as those used in optical fiber systems as laser diodes and so on or such optical sources which are also described in detail in the above referenced article, one could couple light containing different information into the concentric core fiber 10 and hence, the direction of propagation is changed. In replacing the detectors 30 and 31 with an optical source, one would utilize a small diameter fiber in place of the large diameter cane 32. The dimensions of this fiber would be consistent with the diameter of fiber 25. In this alternative approach, one would experience a loss of power when employing a smaller diameter fiber, but the scheme would enable coupling of light into the concentric core fiber 10 as above described.

Hence, there is shown an optical coupler for a concentric core fiber, which coupler employs a step index fiber secured to the concentric core fiber. Light propagating in the substrate of the step index fiber is coupled from or to the outer core of the concentric core fiber, thus eliminating the need for expensive and complicated components to achieve coupling in a concentric core configuration.

I claim:

1. A coupling apparatus for optical fibers, comprising:
   a longitudinal core fiber, having a cross section consisting of a series of annular layers, with an inner central layer manifesting an inner light conducting core of a given diameter, surrounded by an annular isolation zone of a given width and fabricated from a borosilicate glass, with said zone surrounded by an outer light conducting annular core concentric with both said inner core and said zone, said fiber having an end face of said cross section,
   a step index fiber having an end face containing an annular cross section juxtaposed with said end face of said concentric core fiber, with an inner light conducting central core of relatively the same diameter as said inner core of said concentric fiber, with said central core surrounded by an annular cladding layer relatively congruent with said isolation zone and fabricated from the same type of glass as said isolation zone, said cladding layer surrounded by an annular light conducting substrate layer aligned with and facing said outer annular core, whereby light propagating in said inner core of said concentric core fiber is coupled to said central core of said step index fiber and light propagating in said outer core of said concentric core fiber is propagated in said substrate layer and means coupled to said substrate layer of said step index fiber responsive to light propagating therein and therefore responsive to light propagating in said outer light conducting annular core.

2. The coupling apparatus according to claim 1 wherein
said means coupled to said substrate layer of said step index fiber comprises a cylindrical glass rod positioned parallel to said central core of said step index fiber and directed along the surface of said substrate.

3. The coupling apparatus according to claim 2 further comprising
first optical detecting means coupled to said central core of said step index fiber and responsive to light propagating therein, and second detecting means coupled to said substrate layer of said step index fiber and responsive to light signals propagating therein.

4. The coupling apparatus according to claim 2 wherein
the diameter of said glass rod is at least ten times the diameter of said step index fiber.

5. The coupling apparatus according to claim 4 wherein
the diameter of said step index fiber is greater than 100 microns.

6. The coupling apparatus according to claim 1 wherein
said inner core of said concentric core fiber is approximately 35 microns in diameter.

7. The coupling apparatus according to claim 1 wherein
said width of said isolation zone is approximately 30 microns.

8. The coupling apparatus according to claim 1 wherein
said isolation zone is fabricated from a borosilicate glass, with said cladding layer of said step index fiber fabricated from a borosilicate glass.

9. The coupling apparatus according to claim 1 wherein
said juxtaposed end faces of said concentric core fiber and said step index fiber are fused together in alignment by means of a bond produced by heating said end faces.

10. The coupling apparatus according to claim 1 wherein
said means coupled to said substrate of said step index fiber includes an optical source for selectively propagating light signals in said substrate and therefore in said outer layer of said concentric core fiber.

* * * * *